July 11, 1939.    M. J. KERMER    2,165,272
EVAPORATOR
Filed May 22, 1937    2 Sheets-Sheet 1
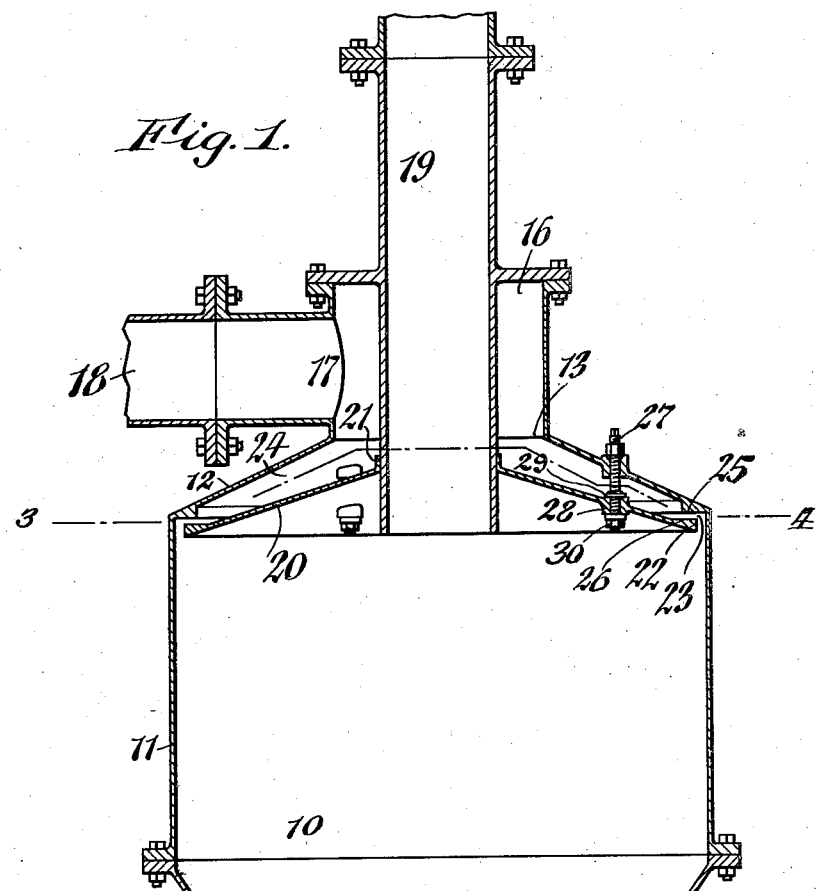
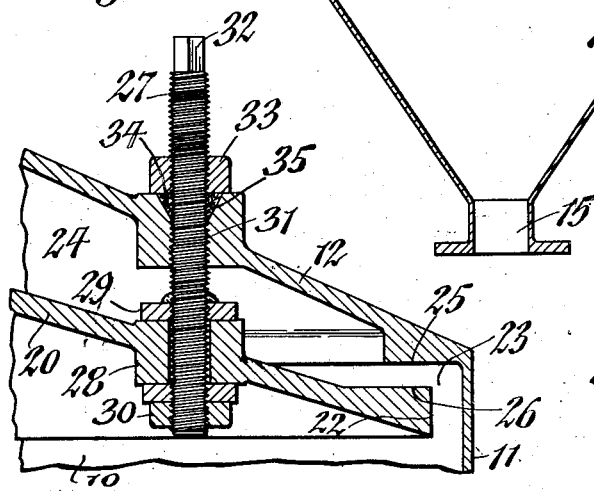
INVENTOR
Martin J. Kermer
BY
ATTORNEYS July 11, 1939.  M. J. KERMER  2,165,272

EVAPORATOR

Filed May 22, 1937   2 Sheets-Sheet 2

INVENTOR
Martin J. Kermer
BY
ATTORNEYS

Patented July 11, 1939

2,165,272

UNITED STATES PATENT OFFICE 2,165,272

EVAPORATOR

Martin J. Kermer, Buffalo, N. Y., assignor to Buffalo Foundry & Machine Co., Buffalo, N. Y., a corporation of New York Application May 22, 1937, Serial No. 144,263

2 Claims. (Cl. 210—58)

This invention relates to a separator which forms part of an evaporator whereby the crystal or salt laden liquors are separated as to the liquid or watery content and the salt or crystals therein. An apparatus of this general character is shown in the Letters Patent of the United States No. 2,025,059 granted December 24, 1935, and the present invention is an improvement on this earlier evaporator.

In the separator forming part of the evaporator of this earlier patent the crystal laden liquor was carried by means of an inlet or delivery pipe a considerable distance toward the lower or crystal outlet end of a settling chamber and an annular baffle was arranged around the upper part of this inlet pipe for the purpose of compelling the liquid issuing from the lower or discharge end of the inlet pipe to travel laterally outward and upwardly a considerable distance before this liquid escaped through the central liquid outlet at the upper end of the settling chamber. The crystal laden liquor was delivered from the lower end of the liquor inlet pipe at a relatively high speed but the velocity of this liquor was gradually reduced until it reached the outer edge of the baffle so that crystals entrained in the liquor would gradually grow from the time the liquor discharged from the inlet pipe until they reached the outer edge of the baffle and precipitated from the liquor toward the bottom of the settling chamber where they would be removed.

In this prior patent the discharge end of the liquor inlet pipe was arranged in the lower part of the settling chamber and the baffle was arranged in the upper part of this chamber whereby the crystal laden liquid was obliged to travel upwardly a considerable distance from this inlet pipe to the baffle which is objectionable on account of the comparatively short space through which the crystals were able to fall through the liquor from the time they left the inlet pipe until they reached the baffle and, therefore, retarded the growth of the crystals and thus necessitated repeated circulation of the liquor through the evaporator which involved a loss of time, reduced the capacity of the evaporator and consumed unnecessary power to effect repeated circulation of the liquor.

One of the objects of this invention is to provide a separator for evaporators of this character in which the crystals are caused to drop through a body of liquor of comparatively greater depth in the settling chamber and thus enable these crystals to grow larger and more rapidly, thereby increasing the output of the apparatus and expediting the evaporating operation and also reducing the amount of power consumed for effecting the circulation of the liquor.

Another object of this invention is to render the baffle adjustable with reference to the adjacent parts of the settling chamber in order to produce a uniform distribution of liquor as it flows from the liquid inlet pipe to the annular passage between the baffle and the shell of the settling chamber.

In the accompanying drawings:

Fig. 1 is a vertical section of a separator for evaporators embodying my improvements.

Fig. 2 is a fragmentary vertical section, on an enlarged scale, taken on line 2—2, Fig. 4 and showing the preferred means for adjusting the baffle vertically with reference to the shell of the settling chamber.

In the following description similar characters of reference indicate like parts in the several figures of the drawings.

Figure 3:
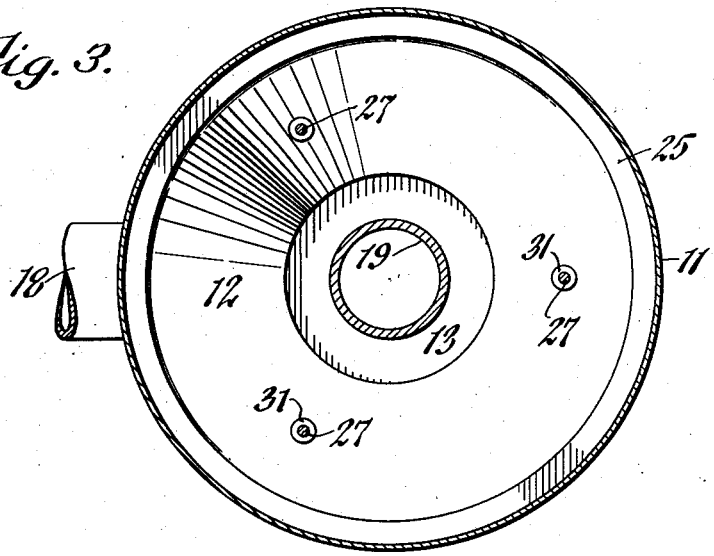
Fig. 3 is a horizontal section taken on line 3—4, Fig. 1 looking upwardly.
Figure 4:
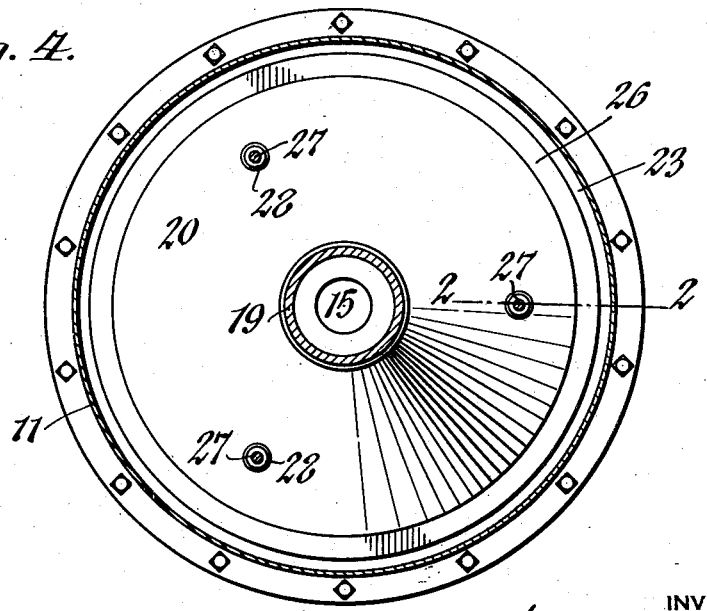
Fig. 4 is a horizontal section taken on line 3—4 looking downwardly.

Referring to the drawings, the numeral 10 represents the settling chamber of the separator which forms part of the evaporator and whereby the salts or crystals are separated from the liquid comprising the liquor.

The enclosure or shell of this settling chamber preferably comprises an upright central wall 11 of cylindrical form, an upwardly tapering top 12 which is connected at its outer edge with the upper edge of the wall 11 and is provided in its central and elevated part with a liquid outlet 13, and a lower downwardly tapering bottom 14 which is connected at its upper end with the lower edge of the side wall 11 and provided centrally in its lowermost part with a crystal outlet 15. The latter may be provided with a valve mechanism of any suitable character whereby the crystals may be discharged from this chamber when desired but the liquid retained in this chamber such, for example, as the valve shown at the lower end of the settling chamber in United States Patent No. 2,025,059.

Above the settling chamber is arranged a liquid outlet dome or chamber 16 which is of smaller diameter than the largest diameter of the settling chamber and has its lower end communicating with the upper central part of the settling chamber through the liquid outlet 13. At its side the liquid outlet chamber or dome 16 is provided with a liquid outlet 17 which is connected by means of a pipe 18 with a pump of any suitable character whereby the liquid is withdrawn from the upper central part of the settling chamber and returned to the means whereby the liquid is heated preparatory to being again returned to the central part of the settling chamber so that by repeatedly circulating this liquid through the evaporator the maximum amount of crystals contained in the liquor will be removed therefrom.

After the liquor has been heated the same is delivered to the usual catch-all of the evaporator which is connected with a vapor exhausting device and is delivered from this catch-all to a vertical pipe 19 which extends downwardly through the central part of the dome 16 and terminates in the upper central part of the settling chamber 10 so as to deliver the crystal laden liquor into this part of said chamber.

In the absence of any provision to control the flow of the liquor after the same is discharged from the lower end of the inlet pipe 19 into the upper part of the settling chamber this liquor would immediately flow upwardly from the lower or discharge end of the inlet pipe 19 to the central outlet 13 of the settling chamber and then escape through the outlet 17 of the contracted dome 16 so that only a small amount, if any, of the crystals entrained in the liquor would be separated therefrom and drop to the bottom of the settling chamber. Moreover this rapid flow of the liquor from the lower end of the inlet pipe 19 to the upper outlet of the settling chamber would not permit the crystals during this part of their passage to grow to any considerable extent.

Means are, therefore, provided for causing the liquor as it escapes from the lower end of the pipe 19 to spread out radially in the settling chamber in all directions upon entering the same until it reaches the periphery of this chamber thereby causing the rate at which the liquor moves to be slowed up and enable the crystals therein to separate from the liquid and drop to the bottom of the settling chamber. After the liquor reaches the periphery of the settling chamber the controlling means direct this liquor radially inwardly and upwardly to the central liquid outlet 13 of the settling chamber from which it is withdrawn by the pump and delivered to the heater preparatory to being again circulated.

The preferred form of the liquor controlling means shown in the drawings and embodying my invention are constructed as follows:

The numeral 20 is an annular baffle which preferably has the form of a downwardly flaring cone, ring or disk and arranged in the annular space between the lower end of the liquor inlet pipe 19 and the adjacent peripheral part of the settling chamber. In the preferred construction the central elevated part of this baffle is provided with an opening which receives the lower part of the inlet pipe 19 and this baffle is provided around this opening with an upwardly projecting collar 21 which engages with the periphery of the pipe. This baffle has its peripheral edge 22 separated by a narrow annular outlet passage 23 from the adjacent upper part of the settling chamber shell and the upper side of this baffle is spaced from the top 12 of the settling chamber so as to form an annular outlet passage 24 therebetween which leads from the outer peripheral passage 23 of the settling chamber to the inner central outlet 13 thereof. The peripheral edge 22 of the baffle and the lower end of the inlet pipe 19 are both arranged in the upper part of the settling chamber and substantially on the same horizontal line so that by far a greater part of the depth of the settling chamber is arranged between the lower end of the inlet pipe and the peripheral edge 22 of the baffle and the bottom of the settling chamber.

As a certain volume of crystal laden liquor passes downwardly under a certain pressure through the inlet pipe 19 the same moves at a speed of comparatively high velocity due to the relatively small cross section of this pipe, but when this liquor passes from the lower end of the inlet pipe to the annular passage between the periphery of the baffle and the side wall of the settling chamber the speed or velocity of the movement of the liquor gradually diminishes owing to the gradual increase in the area or size of the space through which the same volume of liquor moves under the same pressure at this time. This reduction in the velocity of the liquor permits the salts or crystals to separate from the liquid of the liquor and precipitate in the settling chamber to the bottom thereof where they are removed as desired through the crystal outlet 15 while the liquid from which the crystals have been separated passes upwardly through the annular passage 23, thence radially inward through the passage 24 to the central outlet 13 at the top of the settling chamber and then is again recirculated through the other parts of the evaporator until the same again reaches the settling chamber for the purpose of removing further crystals which may be entrained in the liquor.

In using separators of the type heretofore known in which the lower outlet end of the liquid inlet pipe is arranged in the lower part of the settling chamber the crystals which are separated from the liquid in passing laterally from the liquid inlet pipe to the periphery of the baffle drop through a body of liquor which is comparatively shallow and the crystals, therefore, do not have an opportunity to grow to any considerable extent during their descent from the time they are separated from the rich incoming liquor up to the time they reach the bottom of the settling tank. It necessarily follows that much of the liquor must be recirculated a number of times through the evaporator before the maximum amount of crystals or salts are removed therefrom and thus reduces the capacity of the apparatus and increases the cost of recovering the crystals. In the present apparatus the lower or discharge end of the inlet pipe 19 terminates in the upper part of the settling chamber substantially on a line with the peripheral edge of the baffle so that the crystals in the liquor take a substantially horizontal course from the time they leave the inlet pipe up to the time they reach the annular outlet passage 23 between the baffle and the side wall of the settling chamber so that the crystals begin to separate from the liquor immediately upon the discharge of this liquor from the lower end of the inlet pipe and the amount of crystals thus separated from the liquor gradually increases as the movement of the liquor slows up on its way from the inlet pipe to the outer edge of the baffle. Due to the location of the lower discharge end of the liquor inlet pipe in the upper part of the settling chamber substantially in horizontal alignment with the outer edge of the baffle all of the crystals which are separated from the liquor during this horizontal radial outer movement are caused to pass downwardly through practically the entire depth of the body of liquor within the settling chamber, thereby giving the separated crystals the maximum opportunity to grow to the fullest extent and thus expedite the formation of crystals and the separation of the same from the liquid of the liquor. By thus enabling the crystals to separate from the liquid and to promote their growth as they precipitate through the body of liquor which is of much greater depth than that available in the evaporators heretofore in use, a considerable saving in cost of producing such crystals is effected due to the reduced amount of heat which otherwise would be necessary for repeatedly heating the liquor and an increase in the output of the apparatus is obtained.

The velocity or rate of speed at which a liquor should flow from the discharge end of the inlet pipe to the annular outlet passage 23 is dependent upon the character of the liquor which is being treated and the stream of liquor should also be uniformly distributed circumferentially in the apparatus. In order to permit of adjusting the velocity of the liquor and secure a uniform distribution and flow of the same as it passes from the discharge end of the liquor inlet pipe 19 to the outer edge of the baffle, means are provided whereby the capacity of the annular passage 23 can be increased or decreased in its entirety or in parts thereof as much as may be required to secure the desired rate of flow and also effect a proper distribution for insuring a uniform flow of the liquor while the crystals are precipitating therefrom. The preferred means for this purpose which are shown in the drawings are constructed as follows:

The numeral 25 represents a downwardly turned stationary valve face of annular form arranged on the shell or enclosure of the settling chamber preferably at the corner between the side wall 11 and the top 12 of the same, as shown in Figs. 1 and 2. On the upper side of the peripheral edge portion of the baffle 20 the latter is provided with an upturned annular valve face 26 which opposes the upper stationary valve face 25. The baffle is adjustable vertically for the purpose of not varying the size or capacity of the annular passage 23 to suit the character of the particular liquor which is being treated and insure a uniform flow of the liquor from the central inlet pipe 19 to the circumference of the settling chamber and thus secure the most efficient separation of the crystals or salt from the liquid. During such vertical adjustment of the baffle its central collar 21 slides on the lower part of the periphery of the inlet pipe 19 but after such adjustment has been effected the peripheral edge of the baffle is still substantially in horizontal alignment with the discharge end of the liquor inlet pipe 19.

Various means may be provided for effecting the raising and lowering of the baffle for moving the valve face 26 thereof toward and from the fixed valve face 25 on the shell or enclosure of the settling chamber. It is preferable, however, to employ for this purpose means which are accessible from the exterior of the apparatus which means, as shown in the drawings, comprise a plurality of upright adjusting screws 27 which are arranged in an annular row equidistant around the axis of the settling chamber, baffle and inlet pipe 19 and are preferably rigidly connected at their lower ends with a baffle while the upper ends of these screws are movable vertically relative to the top 12 of the settling chamber. For this purpose each of the adjusting screws 27 rotates with its lower part in an eye or enlargement 28 on the baffle and is held against vertical movement therein by means of a collar 29 secured to the screw and bearing against the upper side of the eye 28 and a nut 30 applied to the lower end of this screw and bearing against the lower side of this eye. The upper part of the screw 27 has a threading engagement with the bore of an eye 31 arranged on the adjacent part of the top 12 of the settling chamber so that upon turning this screw by means of a wrench applied to the squared upper end 32 thereof this screw will turn in the lower eye 28 but rise and fall in the upper eye 31 and carry the baffle 20 either upwardly or downwardly depending upon the direction in which the screw 27 is turned. After the several screws 27 have been turned the required extent for bringing the different parts of the cooperating valve faces 25 and 26 in the proper position relatively to secure a uniform distribution or flow of liquor from the inlet pipe 19 to the annular outlet passage 23 then these screws are secured against further turning movement and a tight joint is produced between the same and the top of the settling chamber by means of clamping screw nuts 33 each of which is applied to the upper part of one of the adjusting screws 27 and bears against a packing ring 34 surrounding the screw and seated within a downwardly tapering pocket 35 in the upper end of the respective eye 31, as best shown in Fig. 2.

These means for securing this increased efficiency in a crystal separator for evaporators and also permitting of readily adjusting the same so as to secure uniform distribution of the liquor which is under treatment are comparatively simple in construction, easily and readily operable and do not effect any substantial increase in cost.

I claim as my invention:

1. A separator for evaporators adapted to separate crystals from liquors comprising a settling chamber provided in its lower part with an outlet for crystals and in its upper part with an outlet for liquid and also provided around said liquid outlet with an annular downwardly facing valve face, a liquor inlet conduit having its discharge end terminating in the upper part of said settling chamber, a vertically movable baffle arranged within the upper part of said settling chamber and surrounding said liquor inlet conduit and provided with an annular upwardly facing valve face opposite the valve face of the settling chamber, and means for adjusting said baffle vertically for varying the distance between said valve faces.

2. A separator for evaporators adapted to separate crystals from liquors comprising a settling chamber provided with a liquid outlet in the central part of its top, an annular valve face around said liquid outlet and adjacent to the junction between the top and side wall of said settling chamber and a crystal outlet at the lower end of said settling chamber, a liquor inlet conduit extending downwardly through said liquid outlet and having its lower discharge end terminating in the upper part of said settling chamber, a downwardly flaring baffle arranged in the upper part of said settling chamber and surrounding said liquor inlet conduit and provided on its margin with an annular valve face which opposes the valve face on said settling chamber, and means for adjusting said baffle vertically for varying the distance between said valve faces including a plurality of adjusting bolts connected at their lower ends with said baffle and extending with their upper ends through the top of said settling chamber, and adjusting screw nuts arranged on said bolts and bearing against the top of said settling chamber.

MARTIN J. KERMER.